(12) United States Patent
Feng et al.

(10) Patent No.: US 11,211,701 B2
(45) Date of Patent: Dec. 28, 2021

(54) ELECTRONICALLY SCANNED ARRAY ANTENNA DEVICE FOR USE IN MILLIMETER WAVE IMAGING SYSTEM

(71) Applicants: CHINA COMMUNICATION TECHNOLOGY CO., LTD., Guangdong (CN); Shenzhen Institute of Terahertz Technology and Innovation, Guangdong (CN)

(72) Inventors: Zhihui Feng, Guangdong (CN); Chunchao Qi, Guangdong (CN); Hanjiang Chen, Guangdong (CN); Rong Wang, Guangdong (CN); Shukai Zhao, Guangdong (CN)

(73) Assignees: CHINA COMMUNICATION TECHNOLOGY CO., LTD., Guangdong (CN); Shenzhen Institute of Terahertz Technology and Innovation, Shenzhen (CN)

( * ) Notice: Subject to any disclaimer, the term of this patent is extended or adjusted under 35 U.S.C. 154(b) by 0 days.

(21) Appl. No.: 16/334,582

(22) PCT Filed: Dec. 15, 2016

(86) PCT No.: PCT/CN2016/110010
§ 371 (c)(1),
(2) Date: Mar. 19, 2019

(87) PCT Pub. No.: WO2018/049742
PCT Pub. Date: Mar. 22, 2018

(65) Prior Publication Data
US 2020/0220261 A1    Jul. 9, 2020

(30) Foreign Application Priority Data

Sep. 19, 2016 (CN) .......................... 201610832404.6

(51) Int. Cl.
*H01Q 3/22* (2006.01)
*H01Q 21/06* (2006.01)
(Continued)

(52) U.S. Cl.
CPC ............... *H01Q 3/22* (2013.01); *H01Q 21/06* (2013.01); *H04B 10/2507* (2013.01); *H04N 5/2256* (2013.01)

(58) Field of Classification Search
None
See application file for complete search history.

(56) References Cited

U.S. PATENT DOCUMENTS

| 4,814,774 A | 3/1989 | Herczfeld |
| 4,924,086 A * | 5/1990 | Weber ................ G01N 21/8901 250/235 |

(Continued)

FOREIGN PATENT DOCUMENTS

| CN | 102003997 A | 4/2011 |
| CN | 103414519 A | 11/2013 |

(Continued)

OTHER PUBLICATIONS

Machine level translation Zhou et al., CN 104466404 A.*

(Continued)

*Primary Examiner* — Mohammad J Rahman
(74) *Attorney, Agent, or Firm* — Young Basile Hanlon & MacFarlane, P.C.

(57) ABSTRACT

An electrically scanned array antenna device applied to a millimeter wave imaging system is provided. The electrically scanned array antenna device comprises an adjustable light source for outputting an optical signal with an adjustable wavelength; an electro-optical modulation module; an optocouple; a time delay module for performing optical delay of different duration on each modulated signal, and (Continued)

correspondingly changing the duration of the optical delay according to the wavelength of the optical signal to obtain modulated signals of different phases; an optical detector; and an array antenna. The millimeter wave is loaded on the optical signal with an adjustable wavelength to obtain a modulated signal; the modulated signal is divided into multiple signals; time delay of different duration is performed on each signal; and millimeter wave signals of different phases are obtained after demodulation and are simultaneously transmitted to scan an object to be measured.

16 Claims, 3 Drawing Sheets

(51) Int. Cl.
*H04B 10/2507* (2013.01)
*H04N 5/225* (2006.01)

(56) References Cited

U.S. PATENT DOCUMENTS

| | | | | |
|---|---|---|---|---|
| 6,006,175 | A * | 12/1999 | Holzrichter | A61B 5/0507 704/205 |
| 6,337,660 | B1 * | 1/2002 | Esman | H01Q 3/2676 342/375 |
| 6,574,021 | B1 * | 6/2003 | Green | H01Q 3/22 342/157 |
| 8,463,324 | B1 * | 6/2013 | Kormanyos | H01Q 1/523 330/286 |
| 2003/0080899 | A1 | 5/2003 | Lee et al. | |
| 2003/0147434 | A1 * | 8/2003 | Hong | H01S 5/1228 372/25 |
| 2004/0090365 | A1 * | 5/2004 | Newberg | H01Q 3/22 342/368 |
| 2005/0163171 | A1 * | 7/2005 | Ng | H01S 5/02325 372/20 |
| 2006/0285102 | A1 * | 12/2006 | Aoki | G01S 17/36 356/5.1 |
| 2008/0063411 | A1 * | 3/2008 | Lekkas | H04B 10/25758 398/187 |
| 2008/0075470 | A1 * | 3/2008 | Ohira | H04B 10/50575 398/183 |
| 2011/0122912 | A1 * | 5/2011 | Benjamin | H01S 5/4006 372/50.124 |
| 2011/0316721 | A1 * | 12/2011 | Chen | G02B 17/0615 340/995.26 |
| 2013/0120718 | A1 * | 5/2013 | Chikaoka | G03B 21/2033 353/85 |
| 2014/0219666 | A1 * | 8/2014 | Tselniker | H04L 27/2331 398/208 |
| 2014/0254913 | A1 * | 9/2014 | Pang | G06T 7/001 382/144 |
| 2014/0268131 | A1 * | 9/2014 | Tamada | G01J 3/0208 356/301 |
| 2015/0341061 | A1 * | 11/2015 | Kesling | H04B 1/10 375/346 |
| 2016/0109806 | A1 * | 4/2016 | Zeng | G02B 5/005 355/67 |
| 2016/0269122 | A1 * | 9/2016 | Yu | H04B 10/2575 |
| 2017/0187106 | A1 * | 6/2017 | Hashimoto | G09G 5/006 |
| 2017/0329242 | A1 * | 11/2017 | Zhuang | G03F 9/7026 |
| 2017/0357084 | A1 * | 12/2017 | Park | G01N 21/4133 |
| 2018/0292514 | A1 * | 10/2018 | Yoshino | G01S 17/08 |
| 2019/0020109 | A1 * | 1/2019 | Puleri | H01Q 3/2676 |

FOREIGN PATENT DOCUMENTS

| | | |
|---|---|---|
| CN | 103580752 A | 2/2014 |
| CN | 104466404 A | 3/2015 |

OTHER PUBLICATIONS

Search report IP.com.*
Mar. 31, 2006 (Mar. 31, 2006), pp. 37-41, and figure 5 (Li, Dongwen et al., "True-Time-Delay Technologies of Optical Controlled Phased Array Antenna", Laser & Optoelectronics Progress).
Feb. 29, 2008 (Feb. 29, 2008), pp. 33-35, and figure 1 (Zhou, Jianhua et al.,; "Study of Time-Delay Line of Chirped Fiber Grating Applied to Optically Controlled Phased Array Radar", Optics & Optoelectronic Technology).
Jul. 31, 2007 (Jul. 31, 2007), pp. 35-38, and figure 1 (Yan, Jihong et al., "Optical True Time Delay Techniques in Optically Controlled Phased Array Antennas", Optical Communication Technology).
Esman, D.R. et al., "Fiber-Optic Prism True Time-Delay Antenna Feed", IEEE Photonics Technology Letters, 5(11), Nov. 30, 1993 (Nov. 30, 1993), pp. 1347-1349, and figure 2.

* cited by examiner

ELECTRONICALLY SCANNED ARRAY ANTENNA DEVICE FOR USE IN MILLIMETER WAVE IMAGING SYSTEM

CROSS-REFERENCE TO RELATED APPLICATION(S)

This application is a 371 application of International Application No. PCT/CN2016/110010, filed on Dec. 15, 2016, which claims priority to Chinese Patent Application No. 201610832404.6, filed on Sep. 19, 2016, the disclosures of both of which are hereby incorporated by reference in their entireties.

TECHNICAL FIELD

The present disclosure relates to the field of millimeter wave imaging and more particularly to an electronically scanned array antenna device for use in a millimeter wave imaging system.

BACKGROUND

Millimeter waves are characterized by high accuracy, the sensitivity to the shape and structure of a target, high capability of discriminating between a metal target and a background environment, the ability to penetrate plasma, and the like, so that the images obtained through the millimeter waves have a high resolution, and the millimeter waves can identify and detect a target easily. Such unique properties ensure the extensive application prospect of the millimeter wave technology, especially in the fields of non-destructive testing and security inspection.

Currently, the detection on an object under test is mainly achieved by means of a fixed millimeter wave array antenna in the field of security inspection based on millimeter wave imaging. The object under test is carried by a conveying apparatus to pass through the scanning area of the millimeter wave array to be completely scanned and thereby detected. The millimeter wave array antenna of this security inspection system is integrated with a large number of transmitting and receiving antennas, leading to a complex structure that is high in cost but is low in scanning speed and inflexible in use.

SUMMARY

In view of this, it is necessary to provide an electronically scanned array antenna device for use in a millimeter wave imaging system that is simple in structure and convenient to use and can scan an object under test rapidly with no need to move the object under test relative to the millimeter wave array antenna for a complete scan.

An electronically scanned array antenna device for use in a millimeter wave imaging system is characterized by including:

a tunable light source configured to output a wavelength tunable optical signal;

an electro-optical modulation module configured to modulate a millimeter wave signal to the optical signal to obtain a modulated signal;

an optocouple configured to split the modulated signal into multiple signals;

a time delay module configured to optically delay each modulated signal for a different duration and alter the duration of the optical delays according to the wavelength of the optical signal, thereby obtaining modulated signals of different phases;

optical detectors configured to demodulate the modulated signals of different phases to obtain millimeter wave signals of different phases; and an array antenna configured to transmit the millimeter wave signals of different phases.

In one implementation, the time delay module includes a plurality of optical fibers. An input end of each optical fiber is connected to one output end of the optocouple and an output end of each optical fiber is connected to one of the optical detectors. All the optical fibers are equally long. Each optical fiber includes dispersion fibers and single mode fibers. The dispersion fibers in all the optical fibers are orderly increased or decreased in length with a fixed length difference.

In one implementation, a programmable logic module connected to the tunable light source is further included, which is configured to tune the wavelength of the tunable light source according to the scanning angle of the wave beams transmitted by the array antenna.

In one implementation, a millimeter wave signal source is further included, which is connected to the electro-optical modulation module and configured to output the millimeter wave signal to the electro-optical modulation module.

In one implementation, an erbium-doped optical fiber amplifier is further included, having an input end connected to the tunable light source and an output end connected to the electro-optical modulation module, and configured to amplify the optical signal.

In one implementation, a low-noise amplifier is further included, having an input end connected to the millimeter wave signal source and an output end connected to the electro-optical modulation module, and configured to de-noise and amplify the millimeter wave signal.

In one implementation, a plurality of power amplifiers is further included. Each power amplifier has an input end connected to one of the optical detectors and an output end connected to one antenna in the array antenna.

In one implementation, the array antenna is a linear array antenna or a planar array antenna for achieving one-dimensional scanning or two-dimensional scanning on an object under test, respectively.

The above electronically scanned array antenna device for use in a millimeter wave imaging system includes a tunable light source for outputting a wavelength tunable optical signal, an electro-optical modulation module, an optocouple, a time delay module configured to optically delay each modulated signal for a different duration and alter the durations of the optical delays according to the wavelength of the optical signal and thereby obtaining modulated signals of different phases, optical detectors and an array antenna. The electronically scanned array antenna device may load a millimeter wave onto a wavelength tunable optical signal to obtain a modulated signal, split the modulated signal into multiple signals, delay each signal for a different duration, demodulate the delayed signals to obtain millimeter wave signals of different phases and simultaneously transmit the demodulated signals to scan an object under test. This device can achieve a fast scan on the object under test with no need to move the object under test relative to the millimeter wave array antenna for a complete scan, and is simple in structure and convenient to use.

BRIEF DESCRIPTION OF DRAWINGS

To illustrate the technical solutions in implementations of the present disclosure or in the prior art more clearly, drawings required in the description of the implementations will be introduced briefly below. It is apparent that the drawings in the following description are merely part of implementations of the present disclosure and for those of ordinary skill in the art, drawings of other implementations can also be achieved based on such drawings without creative work.

DETAILED DESCRIPTION

To further clarify the objectives, technical solutions and advantages of the present disclosure, the present disclosure will be further described in further detail in combination with the drawings and implementations. It will be understood that the specific implementations described herein are merely intended for explaining the present disclosure and not meant to limit the present disclosure.

Unless otherwise defined, all technical and scientific terms used herein have the same meaning as commonly understood by one of ordinary skill in the art to which this disclosure belongs. The terminology used in the description of the present disclosure herein is for the purpose of describing particular implementations only and is not intended to be limiting of the present disclosure. As used herein, the term "and/or" includes any and all combinations of one or more of the associated listed items.

Figure 1:
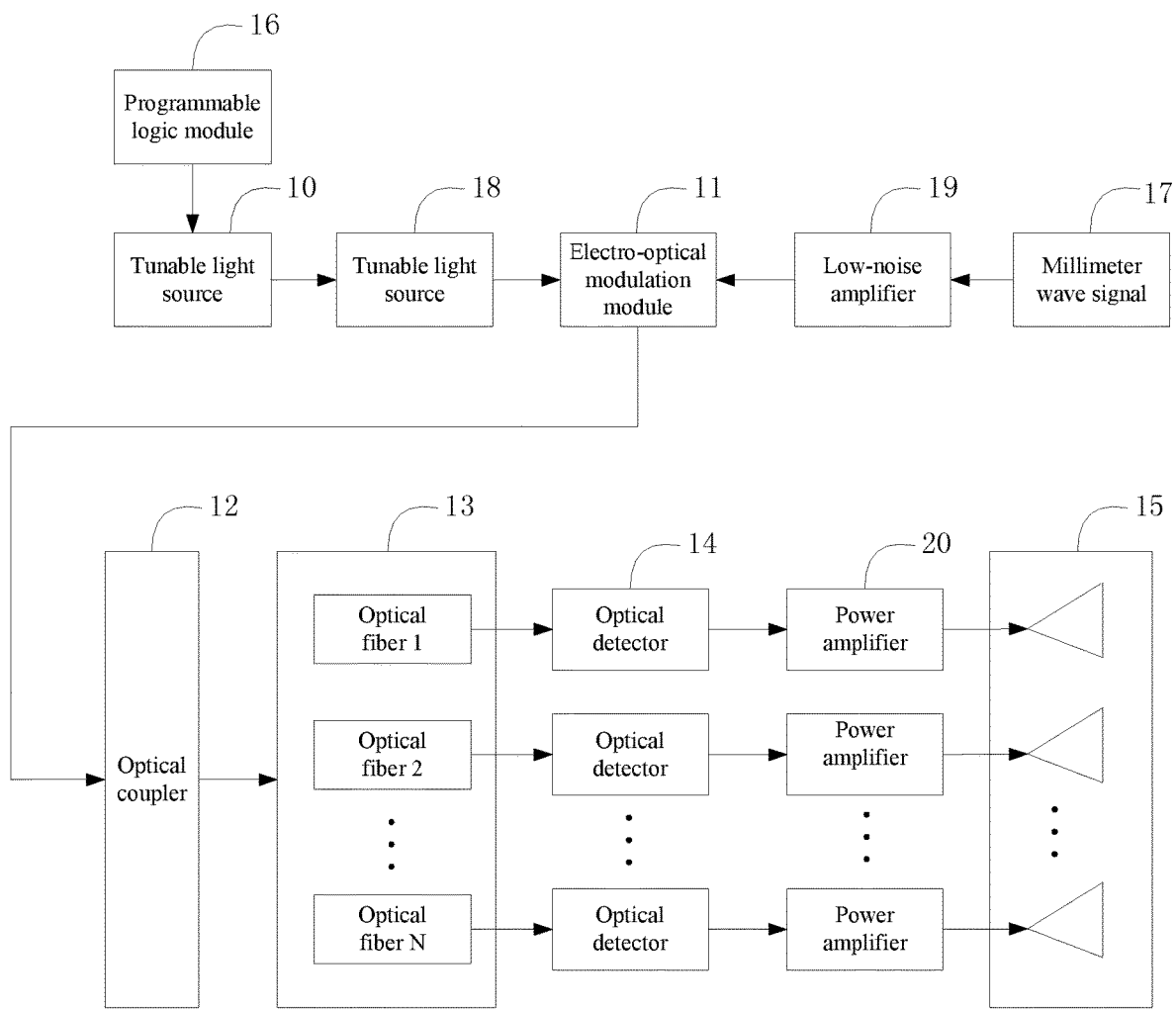
FIG. 1 is a structure diagram of an electronically scanned array antenna device for use in a millimeter wave imaging system in an implementation.

FIG. 1 is a structure diagram of an electronically scanned array antenna device 30 for use in a millimeter wave imaging system in an implementation.

In this implementation, the electronically scanned array antenna device 30 for use in a millimeter wave imaging system includes a tunable light source 10, an electro-optical modulation module 11, an optocouple 12, a time delay module 13, optical detectors 14 and an array antenna 15.

The tunable light source 10 is configured to output a wavelength tunable optical signal.

The electro-optical modulation module 11 is configured to modulate a millimeter wave signal to the optical signal to obtain a modulated signal.

The optocouple 12 is configured to split the modulated signal into multiple signals. The optical signal loaded with the millimeter wave signal, i.e., the modulated signal, is averagely split into multiple signals by power.

The time delay module 13 is configured to optically delay each modulated signal for a different duration and correspondingly alter the duration of the optical delays according to the wavelength of the optical signal, thereby obtaining modulated signals of different phases.

Figure 2:
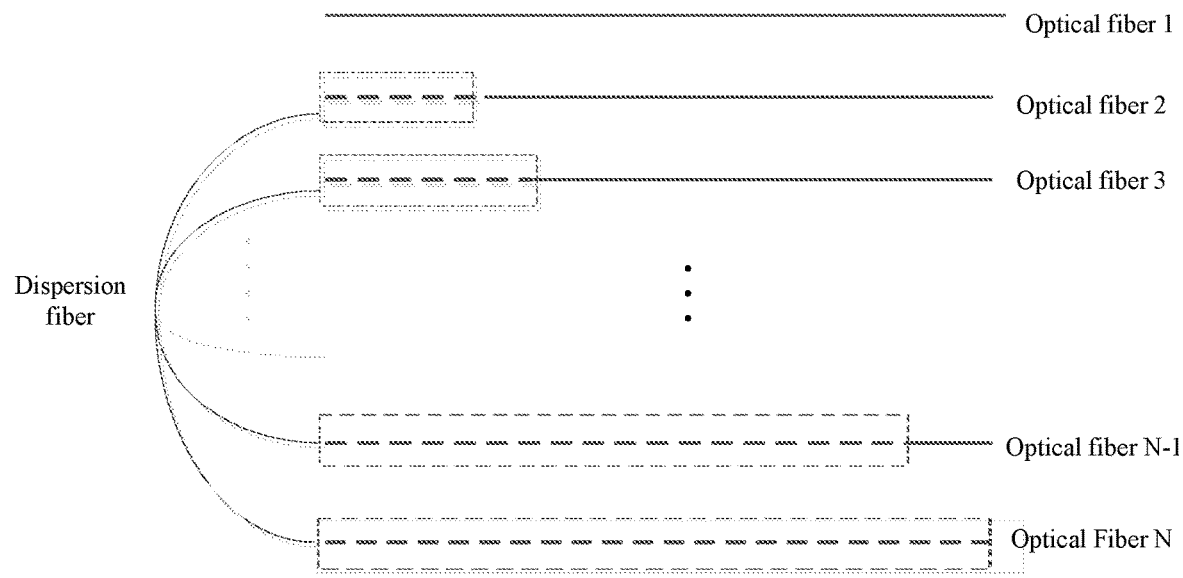
FIG. 2 is a schematic structure diagram of a plurality of optical fibers in an implementation.

Referring to FIG. 2, the time delay module 13 includes a plurality of optical fibers. An input end of each optical fiber is connected to one output end of the optocouple 12 and an output end of each optical fiber is connected to one of the optical detectors 14. All the optical fibers are equally long. Each optical fiber includes dispersion fibers and single mode fibers with a fixed difference in length between any two adjacent dispersion fibers. Since the dispersion fibers in each optical fiber are different in length, each modulated signal may be delayed for different time after being transmitted through the corresponding optical fiber. In addition, the dispersion fibers in all the optical fibers are orderly increased or decreased in length with a fixed length difference. The lengths of the dispersion fibers in all the optical fibers constitute an arithmetic progression, resulting in that the duration of the time delays of all the modulated signals after being transmitted through the optical fibers also constitute an arithmetic progression, and so do their phase changes.

The optical detector 14 is configured to demodulate the modulated signals of different phases to obtain millimeter wave signals of different phases. All the modulated signals delayed by the optical fibers as described above are demodulated to extract the millimeter wave signals. At this time, the millimeter wave signals have corresponding phase changes that constitute an arithmetic progression too.

The array antenna 15 is configured to transmit the millimeter wave signals of different phases. The above millimeter wave signals of which the phases constitute an arithmetic progression are transmitted simultaneously through the array antenna 15. Since such millimeter wave signals are the same in frequency and their phases constitute an arithmetic progression, the direction of wave beams transmitted by the array antenna 15 is deviated relative to the normal direction of the array antenna 15.

In one implementation, the array antenna 15 is a linear array antenna or a planar array antenna for achieving one-dimensional scanning or two-dimensional scanning, i.e., linear scanning or planar scanning, on an object under test, respectively.

Figure 3:
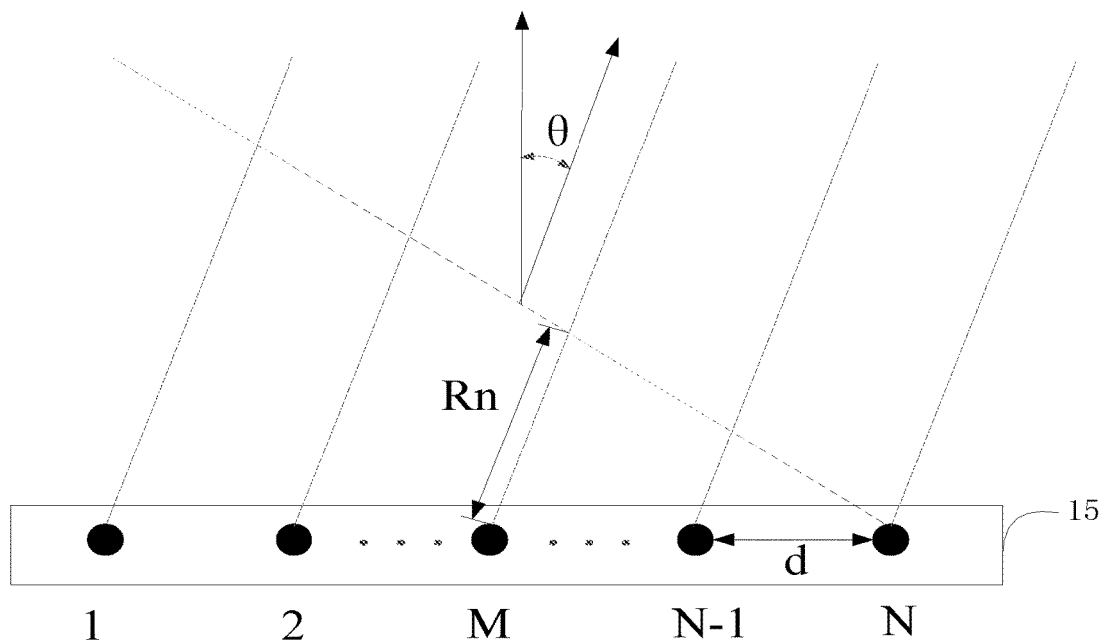
FIG. 3 is a schematic diagram of wave beams transmitted by different antennas of an array antenna in an implementation.

FIG. 3 is a schematic diagram of wave beams transmitted by different antennas of an array antenna in an implementation.

Taking a linear array antenna for example, black solid lines represent the wave beam directions of the antennas in the linear array antenna, while black dotted lines represent isophasal lines of wave beams transmitted by different antennas with d representing the spacing between two adjacent antennas, θ representing the angle of deviation of the wave beam direction of each antenna from the normal line of the plane of the array antenna, and Rn representing the wave path between each antenna and the isophasal line. All the antennas in the linear array antenna are sequentially numbered as 1, 2, . . . , M, N-1 and N in the order of their positions. Taking the antenna numbered as M and the antenna numbered as N for example, the difference between the wave path between the antenna M and the isophasal line, and the wave path between the antenna N and the isophasal line satisfies the following equation:

$$\Delta R_n = (N-M)d \times \sin\theta \quad (1)$$

If the millimeter wave signals transmitted by different antennas in the linear array antenna are not delayed, the isophasal line of the wave beam transmitted by each antenna will be perpendicular to the normal line of the linear array antenna and parallel to the plane of the linear array antenna. After the millimeter wave signals transmitted by different antennas are delayed in accordance with the equidifferent principle, the time difference of arrival of the wave beam transmitted by each antenna at the respective isophasal line is $\Delta R_n/C$, so that the isophasal line is still a straight line. In addition, the isophasal line forms a particular angle with the above normal line, thereby changing the wave beam direction of the linear array antenna that is consistent with the wave beam direction of each antenna.

Thus, without mechanically driving the array antenna to move, an object under test that forms the angle θ with the normal line of the linear array antenna can be scanned, achieving scanning direction within a particular range. Similarly, the above scanning rule also applies to the planar array antennas.

Figure 4:
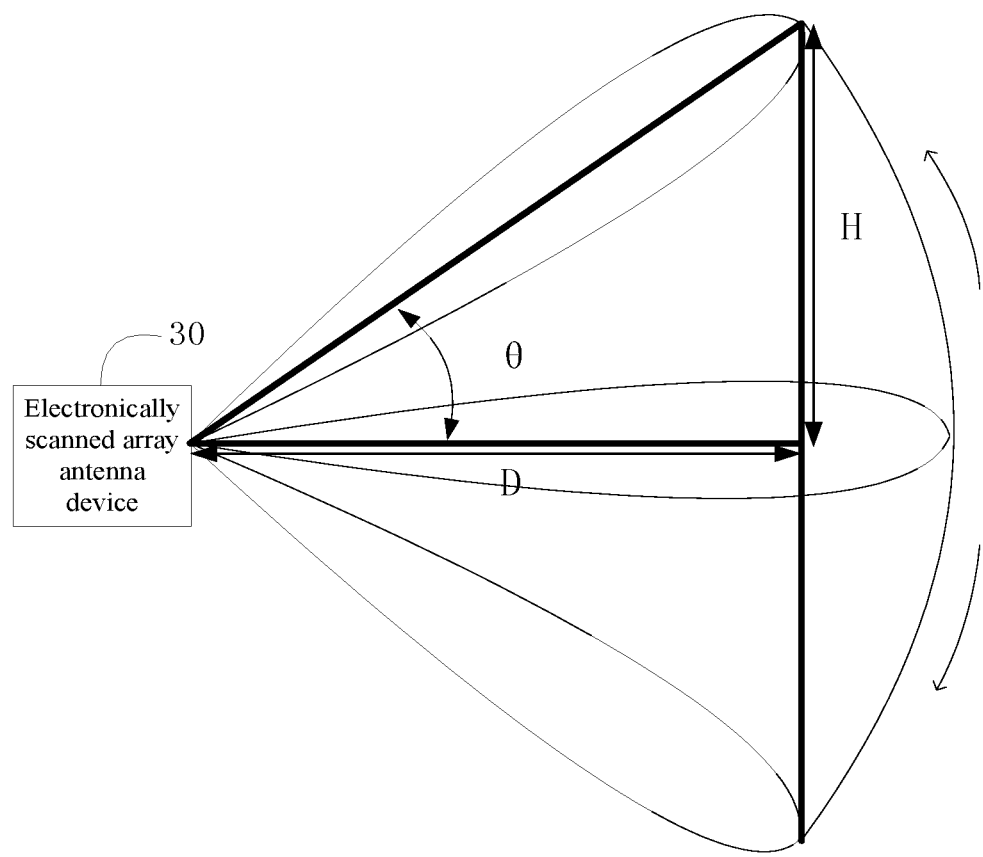
FIG. 4 is a schematic diagram of scanning a human body using the electronically scanned array antenna device for use in a millimeter wave imaging system of the present disclosure in an implementation.

FIG. 4 is a schematic diagram of scanning a human body using the electronically scanned array antenna device 30 for use in a millimeter wave imaging system of the present disclosure in an implementation.

When the object under test is a human body, assuming that the height of the human body is H and the distance between the human body and the electronically scanned array antenna device 30, i.e., the above array antenna 15, is D, the scanning angle of the wave beams transmitted by the array antenna 15 is required to satisfy the following equation:

$$\theta \geq \tan^{-1}(H/D) \qquad (2)$$

Therefore, the maximum scanning angle of the electronically scanned array antenna device 30 can be determined according to the geometric parameters of the object under test, and then the spacing between two adjacent antennas and the difference between the duration of time delays of millimeter wave signals transmitted by the adjacent antennas can be designed according to equation (1), where the difference between the duration of time delays is $\Delta Rn/C$.

Due to different transmission rates of optical signals with different wavelengths in an optical fiber, the duration of time delay can be adjusted by tuning the wavelength of the optical signal transmitted by the tunable light source 10 so as to achieve a greater deviation of the wave beam direction of the array antenna 15 relative to the above normal direction, to meet the requirement of a scanning angle. Continuous adjustment of the wave beam direction can be achieved by continuously tuning the wavelength of the optical signal and then complete detection on the object under test can be realized.

The electronically scanned array antenna device 30 for use in a millimeter wave imaging system can also be used in non-destructive testing of articles to detect and determine whether a human body or an article carries a hazardous article secretly and further used in other application scenarios. As a result, the millimeter wave imaging system can be high in imaging speed and good in effect with improved accuracy and efficiency of detection on an object under test.

In one implementation, as shown in FIG. 1, the electronically scanned array antenna device 30 for use in a millimeter wave imaging system further includes a programmable logic module 16 connected to the tunable light source 10 and configured to tune the wavelength of the tunable light source 10 according to the scanning angle of the wave beam transmitted by the array antenna 15. The programmable logic module 16 may tune the wavelength of the tunable light source 10 by tuning the current or in other ways, thereby altering the duration of time delay of a modulated wave in an optical fiber.

In one implementation, the electronically scanned array antenna device 30 for use in a millimeter wave imaging system further includes a millimeter wave signal source 17 configured to output the millimeter wave signal.

In one implementation, the electronically scanned array antenna device 30 for use in a millimeter wave imaging system further includes an erbium-doped optical fiber amplifier 18, having an input end connected to the tunable light source 10 and an output end connected to the electro-optical modulation module 11, and configured to amplify the optical signal. The erbium-doped optical fiber amplifier 18 is capable of directly amplifying the optical signal, so that the optical signal generated by the tunable light source 10 meets the requirement of optical external modulation.

In one implementation, the electronically scanned array antenna device 30 for use in a millimeter wave imaging system further includes a low-noise amplifier 19. The low-noise amplifier 19 has an input end connected to the millimeter wave signal source 17 and an output end connected to the electro-optical modulation module 11, and is configured to de-noise and amplify the millimeter wave signal. Similarly, the millimeter wave signal is de-noised and amplified to meet the requirement of modulation.

In one implementation, the electronically scanned array antenna device 30 for use in a millimeter wave imaging system further includes a plurality of power amplifiers 20. Each power amplifier 20 has an input end connected to one of the optical detectors 14 and an output end connected to one antenna in the array antenna 15.

All the demodulated millimeter wave signals are amplified in power by the power amplifiers 20 and then transmitted simultaneously by the array antenna 15 to scan an object under test. At this time, the phases of the millimeter wave signals are in a relationship of arithmetic progression, resulting in deviations of the wave beams of the array antenna. Thus, the object under test can be scanned at different angles and thus completely detected.

The above electronically scanned array antenna device 30 for use in a millimeter wave imaging system may load a millimeter wave onto a wavelength tunable optical signal to obtain a modulated signal, split the modulated signal into multiple signals and delay each signal for a different duration. After being delayed, each modulated signal has a phase change, leading to a corresponding phase change of the demodulated millimeter wave signal. The millimeter wave signals are transmitted simultaneously through the array antenna 15 and the wave beam direction of the array antenna 15 may be deviated according to the phase change of each millimeter wave, thereby achieving the scanning on an object under test. This solution allows a fast scan on the object under test and is especially applicable to human body security inspection. The scanning angle of the electronically scanned array antenna device 30 may be determined according to the geometric parameters of the human body and then the wavelength of a carrier optical signal can be tuned to meet the requirement of the scanning angle. With the tunable light source 10, continuous tuning of the optical signal can be realized and then the object under test can be scanned continuously and completely. Thus, the millimeter wave array antenna can achieve complete detection without moving relative to the human body. This device is high in scanning speed, high in detection accuracy, simple in structure, convenient to use and high in practicability.

Different technical features of the above implementations can be combined arbitrarily. For the brevity of description, not all possible combinations of the technical features of the above implementations are described herein. However, such combinations of the technical features shall be deemed to fall into the scope set forth in this description provided that they are not mutually inconsistent.

The above implementations are merely representative of several implementations of the present disclosure and specifically described in detail but cannot be thus interpreted as limitations to the patent scope of the present disclosure. It should be noted that various variations and modifications can be made by one of ordinary skill in the art without departing from the concept of the present disclosure, and they shall all fall into the scope of protection of the present disclosure. Hence, the scope of patent protection of the present disclosure is defined by the appended claims.

What is claimed is:

1. An electronically scanned array antenna device for use in a millimeter wave imaging system, comprising:
a tunable light source configured to output a wavelength tunable optical signal;
an electro-optical modulation module configured to modulate a millimeter wave signal to the optical signal to obtain a modulated signal;
an optocouple configured to split the modulated signal into multiple signals;
a time delay module configured to optically delay each modulated signal for a different duration and alter the duration of the optical delays according to the wavelength of the optical signal, thereby obtaining modulated signals of different phases;
optical detectors configured to demodulate the modulated signals of different phases to obtain millimeter wave signals of different phases;
an array antenna configured to transmit the millimeter wave signals of different phases; and
a programmable logic module connected to the tunable light source and configured to tune the wavelength of the tunable light source by tuning the current according to a scanning angle of wave beams transmitted by the array antenna,
wherein the time delay module comprises a plurality of optical fibers, wherein an input end of each optical fiber is connected to one output end of the optocouple
and an output end of each optical fiber is connected to one of the optical detectors;
all the optical fibers are equally long;
each optical fiber includes dispersion fibers and single mode fibers; and
the dispersion fibers in all the optical fibers are orderly increased or decreased in length with a fixed length difference; and
wherein, a scanning angle $\theta$ of wave beams transmitted by the array antenna satisfies the following equation:

$$\theta \geq \tan^{-1}(H/D)$$

H is the height of an object under test and D is the distance between the object under test and the array antenna.

2. The electronically scanned array antenna device according to claim 1, further comprising a millimeter wave signal source connected to the electro-optical modulation module, and configured to output the millimeter wave signal to the electro-optical modulation module.

3. The electronically scanned array antenna device according to claim 1, further comprising an erbium-doped optical fiber amplifier having an input end connected to the tunable light source and an output end connected to the electro-optical modulation module, and configured to amplify the optical signal.

4. The electronically scanned array antenna device according to claim 2, further comprising a low-noise amplifier having an input end connected to the millimeter wave signal source and an output end connected to the electro-optical modulation module, and configured to de-noise and amplify the millimeter wave signal.

5. The electronically scanned array antenna device according to claim 1, further comprising a plurality of power amplifiers, wherein each power amplifier has an input end connected to one of the optical detectors and an output end connected to one antenna in the array antenna.

6. The electronically scanned array antenna device according to claim 1, wherein the array antenna is a linear array antenna or a planar array antenna for achieving one-dimensional scanning or two-dimensional scanning on an object under test, respectively.

7. The electronically scanned array antenna device according to claim 2, further comprising an erbium-doped optical fiber amplifier having an input end connected to the tunable light source and an output end connected to the electro-optical modulation module, and configured to amplify the optical signal.

8. The electronically scanned array antenna device according to claim 7, further comprising a low-noise amplifier having an input end connected to the millimeter wave signal source and an output end connected to the electro-optical modulation module, and configured to de-noise and amplify the millimeter wave signal.

9. The electronically scanned array antenna device according to claim 2, further comprising a plurality of power amplifiers, wherein each power amplifier has an input end connected to one of the optical detectors and an output end connected to one antenna in the array antenna.

10. The electronically scanned array antenna device according to claim 8, further comprising a plurality of power amplifiers, wherein each power amplifier has an input end connected to one of the optical detectors and an output end connected to one antenna in the array antenna.

11. The electronically scanned array antenna device according to claim 2, wherein the array antenna is a linear array antenna or a planar array antenna for achieving one-dimensional scanning or two-dimensional scanning on an object under test, respectively.

12. The electronically scanned array antenna device according to claim 10, wherein the array antenna is a linear array antenna or a planar array antenna for achieving one-dimensional scanning or two-dimensional scanning on an object under test, respectively.

13. The electronically scanned array antenna device according to claim 1, wherein the lengths of the dispersion fibers in all of the optical fibers constitute an arithmetic progression so that a duration of a time delay of the modulated signals after being transmitted through the optical fibers also constitutes an arithmetic progression.

14. The electronically scanned array antenna device according to claim 1, wherein the length of each the dispersion fibers are different and a modulated signal is delayed for a different time after being transmitted through the corresponding optical fiber based upon the length of each of the dispersion fibers.

15. The electronically scanned array antenna device according to claim 1, wherein the millimeter wave signals have corresponding phase changes that constitute an arithmetic progression.

16. The electronically scanned array antenna device according to claim 1, wherein the millimeter wave signals of the corresponding phase changes are transmitted simultaneously through the array antenna.

* * * * *